United States Patent
Mirabitur

Patent Number: 5,698,276
Date of Patent: Dec. 16, 1997

[54] OVAL ORNAMENT HAVING A LOCKED-IN URETHANE LENS

[75] Inventor: Alfred Joseph Mirabitur, Farmington Hills, Mich.

[73] Assignee: Ford Global Technologies, Inc., Dearborn, Mich.

[21] Appl. No.: 414,567

[22] Filed: Mar. 31, 1995

[51] Int. Cl.[6] .................................................. B32B 9/00
[52] U.S. Cl. .......................... 428/31; 428/13; 428/14; 428/67; 428/118; 428/187; 428/200; 428/203; 428/342.4; 428/425.8; 428/457; 428/458; 428/521; 428/913.3; 427/142; 427/162; 264/1.7; 264/131; 264/135; 264/247; 156/242; 156/247
[58] Field of Search .................... 428/13, 31, 342.4, 428/118, 14, 67, 187, 913.3, 457, 195, 203, 425.8, 458, 200, 521; 156/242, 247; 264/131, 132, 135, 1.7, 247, 274, 254, 263; 427/147, 182

[56] References Cited

U.S. PATENT DOCUMENTS

| | | | |
|---|---|---|---|
| 4,292,827 | 10/1981 | Waugh | 72/46 |
| 4,356,617 | 11/1982 | Coscia | 29/527.4 |
| 4,481,160 | 11/1984 | Bree . | |
| 4,556,588 | 12/1985 | Rockwood | 428/13 |
| 4,597,146 | 7/1986 | Larin | 29/160.6 |
| 4,605,575 | 8/1986 | Auld et al. | 428/14 |
| 4,645,556 | 2/1987 | Waugh et al. | 156/242 |
| 4,737,225 | 4/1988 | Waugh et al. | 156/242 |
| 4,767,647 | 8/1988 | Bree | 428/14 |
| 5,405,675 | 4/1995 | Sawka et al. | 428/195 |
| 5,480,688 | 1/1996 | Kaumeyer | 428/13 |

*Primary Examiner*—Patrick Ryan
*Assistant Examiner*—Abraham Bahta
*Attorney, Agent, or Firm*—Roger L. May; Daniel M. Stock

[57] ABSTRACT

A decorative emblem for a vehicle comprises an oval bezel and a transparent lens. A groove with an angled sidewall is formed in the top surface of the bezel. The sidewall forms an angle with the bottom wall of the groove between 88°30' and 82°30' around the oval bezel so that the sidewall overlies the bottom wall making the groove wider at its bottom than at its top to lock the lens in place. The lens covers the top surface and is formed thereon by pouring a liquid lens material on the top surface of the bezel filling the groove. The liquid lens material cures to a hardened condition and the angled sidewall locks the lens in position over the top surface. The lens is transparent so that colors and designs on the bezel are visible.

9 Claims, 1 Drawing Sheet

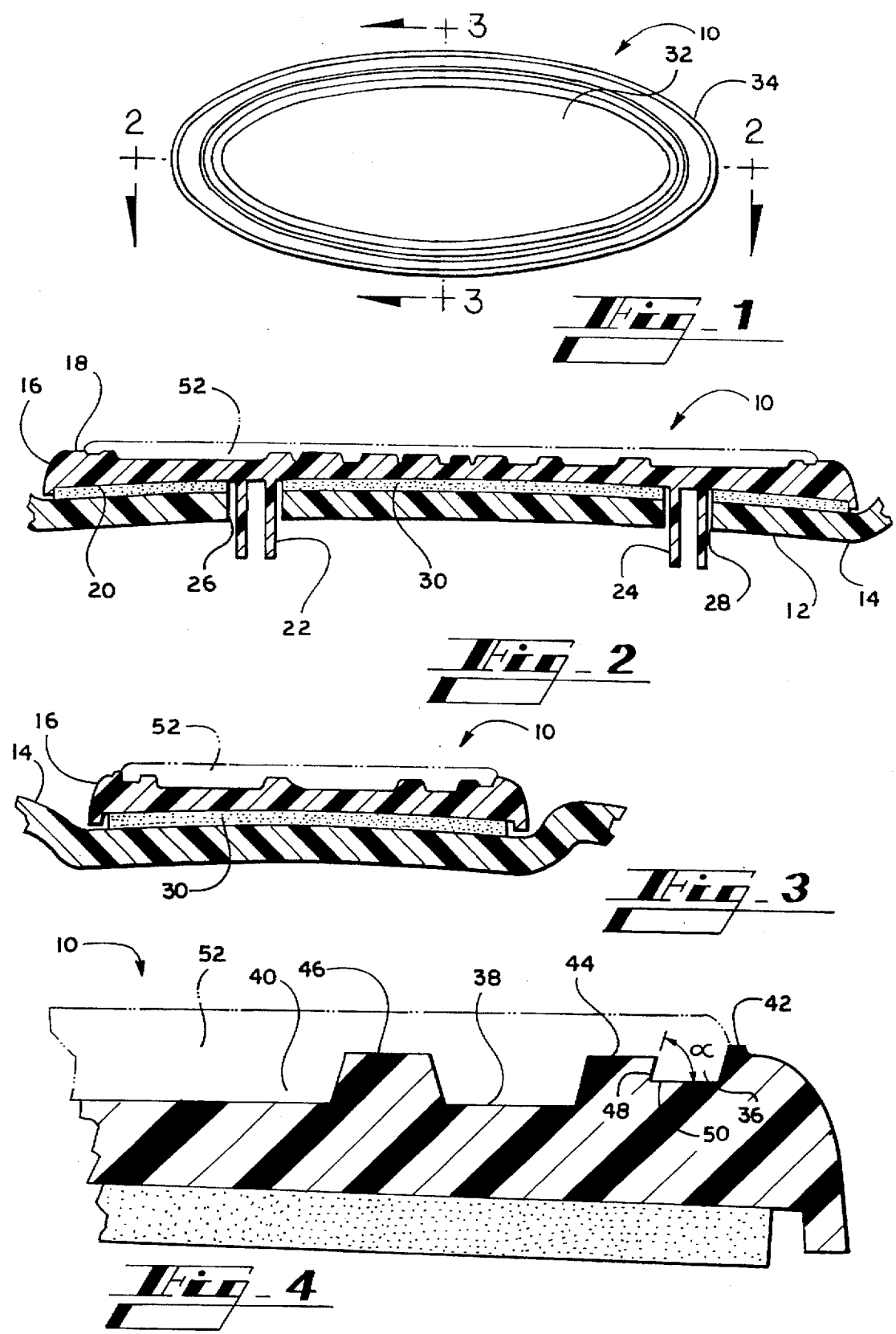

5,698,276

OVAL ORNAMENT HAVING A LOCKED-IN URETHANE LENS

FIELD OF THE INVENTION

The present invention relates to a decorative vehicle ornament and a method of incorporating a transparent lens.

BACKGROUND OF THE INVENTION

Many automobiles and other vehicles are adorned with decorative emblems. Plastic emblems can be molded in various configurations, painted to mimic painted metal, and covered with foil to give a metallic appearance. To protect the finish on an emblem, a plastic lens is positioned over the bezel portion of the emblem. Unfortunately, some lenses are prone to separate from the bezel, and producing intricate lens and bezel configurations required to achieve a lens that stays married to the bezel increases manufacturing time and complexity. Accordingly, it will be appreciated that it would be highly desirable to have a hard, transparent, plastic lens that is simple to manufacture and that stays in position on the bezel.

SUMMARY OF THE INVENTION

The present invention is directed to overcoming one or more of the problems set forth above. Briefly summarized, according to one aspect of the present invention, an emblem for attachment to a panel of a vehicle comprises a bezel and a lens. The bezel has a top surface with inner and outer portions. The surface has an inner sidewall adjacent the inner portion, an outer sidewall adjacent the outer portion and a bottom wall between the inner and outer sidewalls defining a groove in the surface between the inner and outer portions. The inner sidewall forms an angle α with the bottom wall of between 88°30' and 82°30' so that the inner sidewall overlies the bottom wall. The lens covers the top surface and is formed thereon by pouring a liquid lens material on the top surface filling the groove. The liquid lens material cures to a hardened condition and the inner sidewall locks the lens in position over the top surface.

The lens is transparent so that colors and designs painted on the bezel are visible and protected from dirt, debris and airborne contaminants. The lens is locked in position by the angled sidewall which makes the groove larger at its bottom than at its top so that the lens is effectively wedged in place. In addition, when the bezel is oval shaped, the angle of the sidewall changes around the oval increasing the locking effect.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1 is a front view of preferred embodiment of a plastic vehicle emblem with a transparent plastic lens covering the bezel according to the present invention.

FIG. 2 is a somewhat enlarged and simplified sectional view taken along line 2—2 of FIG. 1.

FIG. 3 is a sectional view taken along line 3—3 of FIG. 1.

FIG. 4 is a partial section view similar to FIGS. 2 and 3, but enlarged to illustrate the lens locking groove.

DETAILED DESCRIPTION OF THE PREFERRED EMBODIMENTS

Referring to FIGS. 1–4, an emblem 10 is provided for attachment to a panel 12 of a vehicle 14, such as the front grille of an automobile for example. The emblem 10 has a base member or bezel 16 that has a front or top surface 18 and a rear or bottom surface 20. Fastening members 22, 24 protrude from the bottom surface 20 of the bezel 16 and extend through openings 26, 28, respectively, in the panel 12 of the vehicle 14. The fastening members 22, 24 may be any of several types of fasteners well known in the art for attaching one member to another member using a force fit or deforming a portion of a member after insertion through an opening so that the members are joined. Preferably, a pressure sensitive fastening tape 30 or the like is applied to the bottom surface 20 of the bezel 16 to adhere the bezel 16 to the panel 12. Applying such pressure sensitive tape 30 over the entire bottom surface 20 keeps the emblem 10 quietly in position.

The top surface 18 of the bezel 16 has inner and outer portions 32, 34. For the emblem illustrated, the inner portion 32 has blue pigment with raised, stylized bright work lettering, F o r d; while, the outer portion 34 has alternate portions of blue pigment and bright work. The pigmented portions are preferably formed by applying paint or similar coating as is known in the art. The bright work is preferably formed by plating the bezel 16 with a metal, such as chromium or the like. As illustrated, the emblem 10 has an oval configuration but could be round, rectangular or serpentine.

Referring to FIG. 4, the top surface 18 of the bezel 16 has grooves 36, 38, 40 progressing from the outer portion 34 of the top surface in toward the inner portion 32 of the top surface. The grooves may be continuous or may be segmented. Ridges 42, 44, 46 progress inward from the outer portion 34 of the top surface toward the inner portion 32 of the top surface. Groove 36 lies between ridges 42 and 44, and ridge 44 lies between grooves 36 and 38. Each groove lies between adjoining ridges so that a groove shares its outer sidewall with one groove and shares its inner sidewall with another ridge. This grouping of ridges and grooves facilitates the ornamental design of the emblem. For the emblem illustrated, the blue pigment is applied to the bottom walls of the grooves and the bright work appears on the ridges. For depth of color, the sidewalls of the grooves can be pigmented. Similarly, for depth of bright work, the sidewalls can remain unpigmented thereby having the same finish as the ridges.

The outermost groove 36 shares a common innermost sidewall 48 with adjoining ridge 44. The inner sidewall 48 forms an angle α with the bottom wall 50 of the groove 36 that is an acute angle. As illustrated in FIGS. 2–4, the common sidewall 48 deviates from normal from by 1°30' to about 7°30' thereby making the acute angle α between the common sidewall 48 and bottom wall 50 vary from 88°30' to about 82°30'. The angle α need not be constant but may vary around the groove whether the groove is continuous or segmented. It can be appreciated that at angles greater than about 88°30' the sidewall 48 is almost perpendicular to the bottom wall 50 and is ineffective for holding material in the groove 36. On the other hand, at angles less than about 82°30' the sidewall 48 overlies the bottom wall 50 to such an extent that difficulty is encountered removing tools used to form the groove.

A lens 52 is formed over the top surface 18 of the bezel 16 and is anchored in the groove 36. The slanting sidewall 48 locks the lens 52 in position on the bezel 16. As illustrated, the lens 52 does not cover the outermost ridge 42 for this particular application, but there may be applications where it is desired to extend the lens over ridge 42 as well. In such case the slanting sidewall 48 still locks the lens in position on the bezel. The lens material is preferably a urethane material that is applied to the top surface 18 of the bezel 16 in a liquid state so that it flows over the ridges 44, 46 and into the grooves 36, 38, 40. If it is desired to cover ridge 42 with lens 52, then the liquid lens material is also applied over ridge 42. It may be desirable to erect a form, mold or tool around ridge 42 to contain the lens material while in the liquid state. The tool can then be removed when the lens is hardened.

It can now be appreciated that there has been presented a method for making an decorative, bezel emblem with a locked-in transparent lens. The method includes shaping, by injection molding or the like, a resinous material, such as ABS plastic, into bezel having a top surface with a plurality ridges, and forming at least one groove having an inner sidewall, an outer sidewall and a bottom wall between two adjacent ridges. The method includes joining the inner sidewall and the bottom wall and forming an angle therebetween that varies along the groove from 88°30' to 82°30' so that the inner sidewall overlies the bottom wall. Plating the bezel with a layer of metal and depositing pigmented material in a pattern on a portion of the top surface gives the bezel a luxurious metallic look. The method also includes pouring a curable liquid urethane lens material on the top surface of the bezel and curing the liquid urethane lens material thereby forming a solid transparent lens and simultaneously locking the lens in position in the groove against the angled inner sidewall. Because the lens is applied while in a liquid state, there is absolute abutting contact of the lens along the inner wall of the groove which locks the lens in place on the bezel. There is no gap between the lens and groove even as the angle α changes around the course of the groove.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A method for making an emblem for attachment to a panel of a vehicle, comprising the steps of:

shaping a resinous material into bezel having a top surface with a plurality ridges;

forming at least one groove between two adjacent ridges, said groove having an inner sidewall, an outer sidewall and a bottom wall between said inner and outer sidewalls;

joining said inner sidewall and said bottom wall and forming an angle α therebetween that varies along said groove from 88°30' to 82°30' so that said inner sidewall overlies said bottom wall;

plating the bezel with a layer of metal;

depositing pigmented material in a pattern on a portion of said top surface;

pouring a curable liquid urethane lens material on the top surface of the bezel; and curing said liquid urethane lens material and forming a solid transparent lens and simultaneously locking the lens in position in said groove against said angled inner sidewall.

2. A method, as set forth in claim 1, wherein the step of shaping a resinous material includes shaping said bezel into an oval configuration.

3. A method, as set forth in claim 1, wherein the step of forming at least one groove includes forming a continuous groove in an oval configuration.

4. A method, as set forth in claim 3, including the step of joining said outer sidewall and said bottom wall and forming an angle α therebetween that varies along said groove from 83°30' to 82°30' so that said outer sidewall overlies said bottom wall.

5. An emblem for attachment to a panel of a vehicle, comprising:

an oval, chromium plated bezel having a top surface with a plurality ridges defining a groove between adjacent ridges, each groove having an inner sidewall, an outer sidewall and a bottom wall between said inner and outer sidewalls, said inner sidewall forming an angle α with said bottom wall that varies around said oval bezel from 88°30' to 82°30' so that said inner sidewall overlies said bottom wall;

a painted design on a portion of said top surface; and a transparent lens formed over said top surface by pouring a liquid urethane lens material on said top surface, said angled inner sidewall locking said lens in position as said liquid urethane material hardens.

6. An emblem for attachment to a panel of a vehicle, comprising:

a bezel having a top surface with inner and outer portions, said surface having an inner sidewall adjacent said inner portion, an outer sidewall adjacent said outer portion and a bottom wall between said inner and outer sidewalls defining a groove in said surface between said inner and outer portions, said inner sidewall forming an angle α with said bottom wall of between 88°30' and 82°30' so that said inner sidewall overlies said bottom wall; and a transparent lens covering said top surface in abutting locking contact with said inner sidewall.

7. An emblem, as set forth in claim 6, wherein said lens is formed on said top surface by pouring a liquid lens material on said top surface filling said groove and by curing to a hardened condition thereby locking said lens in position on said top surface.

8. An emblem, as set forth in claim 6, wherein said bezel is oval and said angle α varies between 88°30' and 82°30' around said oval bezel.

9. An emblem, as set forth in claim 6, wherein said groove is oval and said angle α varies between 88°30' and 82°30' around said groove.

* * * * *